March 31, 1942.  T. A. ANDREW  2,277,898
MEANS FOR MEASURING FLOW IN A WELL
Filed April 26, 1940

INVENTOR,
THOMAS A. ANDREW.
By James M. Abbott
ATTORNEY.

Patented Mar. 31, 1942

2,277,898

UNITED STATES PATENT OFFICE 2,277,898

MEANS FOR MEASURING FLOW IN WELLS

Thomas A. Andrew, Glendale, Calif.

Application April 26, 1940, Serial No. 331,816

1 Claim. (Cl. 73—198)

This invention relates to a well tool and particularly pertains to a means for measuring flow in a well.

In the drilling of oil wells and the like and placing them on production it is desirable to ascertain fluid flow conditions within the well and to be able to survey the entire well bore to obtain information relative to the flow of fluid existing at different levels therein. In actual experience it has been proved that even though the well bore is filled with a liquid known as drilling fluid, or is filled with fluid representing the cognate fluid from the formation, either of which produces a definite hydrostatic head, there may be a difference in fluid pressure and a resultant difference in fluid flow at different levels within the well; for example, a relatively constant fluid pressure may exist at one level in the well depending upon the character of the fluid and the hydrostatic head thereupon, and at another level fluid may be entering the well bore from the surrounding formation to produce a fluid flow irrespective of the pressure head of the well. It is the principal object of the present invention, therefore, to provide an instrument which may be lowered into a bore hole whereby the magnitude of fluid flow will be recorded as flow conditions take place throughout the length of a well bore.

The present invention contemplates the provision of and an instrument adapted to be lowered into a well bore and acting to establish zones of differential pressure as created by fluid flow and which pressure influences fluid responsive means acting to plot a chart to indicate the magnitude of fluid flow. The records are obtained by use of a simple instrument which may be positioned within a well bore at desired levels and by which well flow conditions may be accurately ascertained and charted.

The present invention is illustrated by way of example in the accompanying drawing, in which:

Figure 1 is a view in diagram illustrating the manner of use of the present invention in a well bore.

Fig. 2 is an enlarged view in central longitudinal section illustrating the details of construction of the instrument with which the present invention is concerned.

Fig. 3 is a view in transverse section through the instrument as seen on the line 3—3 of Fig. 2 and discloses the upper fluid responsive diaphragm.

Fig. 4 is a view in transverse section as seen on the line 4—4 of Fig. 2 and discloses the intermediate fluid responsive diaphragm.

Referring more particularly to the drawing, 10 indicates a well bore within which it is desirable to ascertain the rate of fluid flow at different levels. Extending downwardly into the well bore is a supporting cable 11 which may be led over a pulley 12 at its upper end and wound or unwound from a drum 13. Associated with the winding drum is a clock 14 and a measuring device 15 co-ordinated therewith whereby the periods during which the cable is paid out or wound in may be recorded and at which time the length of cable paid out may be measured and recorded. Thus, when the cable is fed into the well bore the depth to which an instrument is lowered may be indicated and the time recorded. This structure will also indicate when the cable is being held stationary, at which time a reading may be made.

The structure for recording variation in fluid flow is indicated generally in Fig. 1 at 16 and is shown as being supported on the lower end of the cable 11. This device includes an outer housing 17 which is of sufficient weight to draw the cable taut when the instrument is suspended thereupon, and also to be of sufficient weight to overcome any normal upward pressure exerted by the fluid in the well. It is to be understood that while the cable 11 is shown as being the suspending means for the instrument that this is done merely by example since under some instances it might be desirable to suspend the structure at the lower end of a rigid suspending member, such as tubing or drill pipe.

The lower end of the housing 17 is fitted with a perforated nose 18 threaded to the tube 23 formed with fluid inlet openings 19 which communicate with a central chamber 20. The chamber 20 is separated from the interior of the housing by a flexible diaphragm 21 which is held in place by a fastening ring 22 on the upper end of nose 18. Formed within the housing and disposed upon the opposite side of the diaphragm 21 from the pressure chamber 20 is a pressure passageway 23. This passageway has a lower funnel-like end 24 formed within the housing 17 and terminating within a threaded counterbore 25 which receives the threaded shoulder 22 of the nose and provides a passageway directly upon the opposite side of the diaphragm 21 from the pressure chamber 20 and within which passageway an incompressible fluid is placed, such for example as oil. The upper end of the pressure tube 23 communicates with a compartment 26. A side wall of this compartment is fitted with an intermediate diaphragm 27 held upon a seat 28 by a fastening ring 29. The outer face of the intermediate diaphragm 27 is presented to a longitudinally extending pressure fluid space 30 which extends upwardly to a point near the upper end of the housing 17. The inner wall of the pressure space 30 is defined by a longitudinally extending wall 31 while its outer wall may be the wall of the housing 17. At the upper end of the pressure space 30 the outer wall of the housing is cut away to provide an opening 32 provided with a seat 33. This seat receives an upper pressure diaphragm 34. This diaphragm is held in place by a ring 35. The pressure space 30 is completely filled with an incompressible fluid. It is to be understood also that the space 26 and the spaces 23 and 24 are completely filled with an incompressible fluid.

It will thus be seen that if any one of the diaphragms 21, 27 or 34 is flexed it will produce movement of the remaining other two diaphragms. The diaphragms 21 and 34 are subjected directly to the fluid pressure of the well. The diaphragm 27 is balanced or maintained at a desired equilibrium by the fluid pressure exerted against the diaphragm 21 as opposed to the fluid pressure exerted against the diaphragm 34.

Connected to the intermediate diaphragm 27 is an operating link 36. This link in turn connects to a lever arm 37. The lever arm 37 is secured in a suitable pivotal mounting 38 disposed in the upper end wall of the compartment 26. Extending from the fulcrum portion of the lever structure, including the lever 37, is a stylus lever 39 which carries a stylus 40. Counterbalancing springs 41 and 42 are disposed upon opposite sides of the lever 37 and act against abutments 43 and 44 tending to hold the stylus lever 39 in a position of equilibrium so that it will swing only when influenced by differential pressure upon opposite sides of the diaphragm 27. The stylus 40 travels over a recording ribbon 45 which is carried upon spools 46 and 47. These spools are mounted in suitable bearings 48 within the housing 17. A clock 49 is mounted within the housing and drives the spool 46 through a suitable transmission 50. The clock 49 is, of course, set and operates in synchronism with the clock 14 at the top of the well bore. Thus, it is possible to calibrate the readings above ground and below ground as the instrument is lowered into the hole.

It is desirable to create a restriction within the well bore 10 and around the housing 17 of the recording instrument 16. This will make the recording instrument in effect fit more tightly within the hole than would normally be the case, and will thus insure that the restriction in fluid flow will create a pressure differential between the diaphragm 34 and the diaphragm 21. This restriction is produced by a collar 51 which fits around the body of the tool 16 and is of a materially increased diameter over that of the body of the tool. It is understood, however, that the overall diameter of the collar is somewhat less than the diameter of the well bore 10, thus creating a restricted throat 52 through which fluid flows. The collar 51 may be of any desired material and may be made suitably of rubber. In order to facilitate guiding the instrument down the hole it may be desirable to mount spring guides 53 on the outside of the housing 17 and the instrument 16. This will tend to center the tool in the hole and produce a substantially uniform throat 52 therearound. It will be recognized, however, that the outside diameter of the collar 51 shall be sufficiently small to make it possible for the tool to be easily raised and lowered within the hole without undue restriction. The restriction, however, is sufficient to produce a differential pressure upon opposite sides of the collar.

In operation of the present invention the structure is assembled as here shown and a collar 51 mounted thereon appropriate for the size of the hole within which the tool is to be run. When the tool is started in the hole the clock 49 is started, as well as the clock 14. At the same time the recording device for measuring the length of cable is set in motion so that at any time it can be ascertained how far into the hole the tool has gone, and also the time at which it reached a certain point. It is understood that the well bore is full of fluid. This fluid may be ordinary drilling fluid. It may be the cognate liquids and gases yielded by the formation, and it may be mixed fluids. It often occurs that there are zones of this fluid at different levels in which there is a fluid flow and that at different levels this fluid flow differs in magnitude. As the tool is lowered into the hole the collar 51 will produce a restricted throat 52 between the wall of the bore and the outer surface of the collar, and since this throat will occur between the level of the diaphragm 21 and the level of the diaphragm 34 it will be evident that a differential in pressure will be generated between the two ends of the instrument and will thus cause a different pressure to be imposed upon the diaphragms 21 and 34. The magnitude of pressure differential will vary directly with the velocity of the fluid flow. This pressure will then be imparted through the incompressible fluid in the pressure space 30 and the incompressible fluid in the pressure tube 23 and the compartment 26 to opposite sides of the intermediate diaphragm 27. The diaphragm, therefore, will yield under the superior pressure, and if the pressure exerted by the incompressible fluid in space 30 is greater than the pressure exerted by the fluid in the compartment 26 it will be evident that the diaphragm 27 will be flexed inwardly and will swing the lever 37 in the direction of flexure while the stylus lever 39 swings in the opposite direction. As the stylus lever swings the stylus 40 will inscribe an appropriate graph line 54 upon the ribbon chart 45 as the chart is wound from spool 47 onto spool 46. This will indicate that the superior pressure at a predetermined time is above the collar 51. If, on the other hand, the pressure of the fluid acting in the pressure tube 23 and the compartment 26 overcomes the pressure of the fluid in the pressure space 30 then the diaphragm 27 will flex in the opposite direction and will cause the stylus 40 to move appropriately, which will indicate that the superior pressure is below the collar 51.

It is to be understood that the stylus chart 45 is plotted longitudinally to represent elapsed time and that it is plotted transversely to represent pressure. Thus at any time indicated on the chart the amount of pressure differential due to flow will be indicated and if these readings are synchronized with the readings of the clock 14 and the measuring device 15 at the top of the hole it is possible to accurately ascertain the depth to which the tool has been lowered and flow existing at this depth. By this arrangement the readings showing differential pressure will be in proportion to the rate of flow of the fluid at a particular level in the well and will make it possible to determine the location of horizons at which fluids are entering or leaving the well bore. It is also to be pointed out that these readings may be at any given point within the hole and will not be affected by the head of fluid standing in the hole above the instrument and that the pressure differential due to flow at a particular point may be accurately ascertained. After such readings have been made the tool may be withdrawn from the well.

It will thus be seen that the means here disclosed provide simple, direct and effective means for measuring the fluid flow in a well at any given point and to carry out studies of rates of flow which will directly indicate the condition of the hole throughout its length, including the horizon of a source of production, the horizon of the entry of extraneous fluid into the well bore.

While I have shown the preferred apparatus for carrying out the present invention, it is to be understood that various changes may be made in the details of construction of the apparatus by those skilled in the art without departing from the spirit of the invention as claimed.

Having thus described my invention, what I claim and desire to secure by Letters Patent is:

A tool of the class described, comprising an outer housing, means suspending the same within a well bore, fluid pressure responsive means at the lower end of said housing and subjected to the pressure of the fluid within the well bore below the tool, fluid pressure responsive means adjacent to the upper end of the housing and subjected to the pressure of the fluid within the bore in the area therearound, a restricting member carried on the outer face of the housing at a point between the upper and lower fluid pressure responsive means and acting to restrict the flow of fluid lengthwise of the tool and to create a differential fluid pressure acting against the lower fluid pressure responsive means and the upper fluid pressure responsive means, a pressure responsive intermediate element in said housing subjected to the pressure exerted by the upper and lower fluid pressure responsive means and at opposite sides thereof, and a chronologically operated recording means actuated by said element to record the differential fluid pressure exerted between the upper and lower fluid pressure responsive means in said housing.

THOMAS A. ANDREW.